O. L. BOWERS.
WIRE TYING DEVICE.
APPLICATION FILED DEC. 31, 1909. RENEWED MAY 29, 1911.

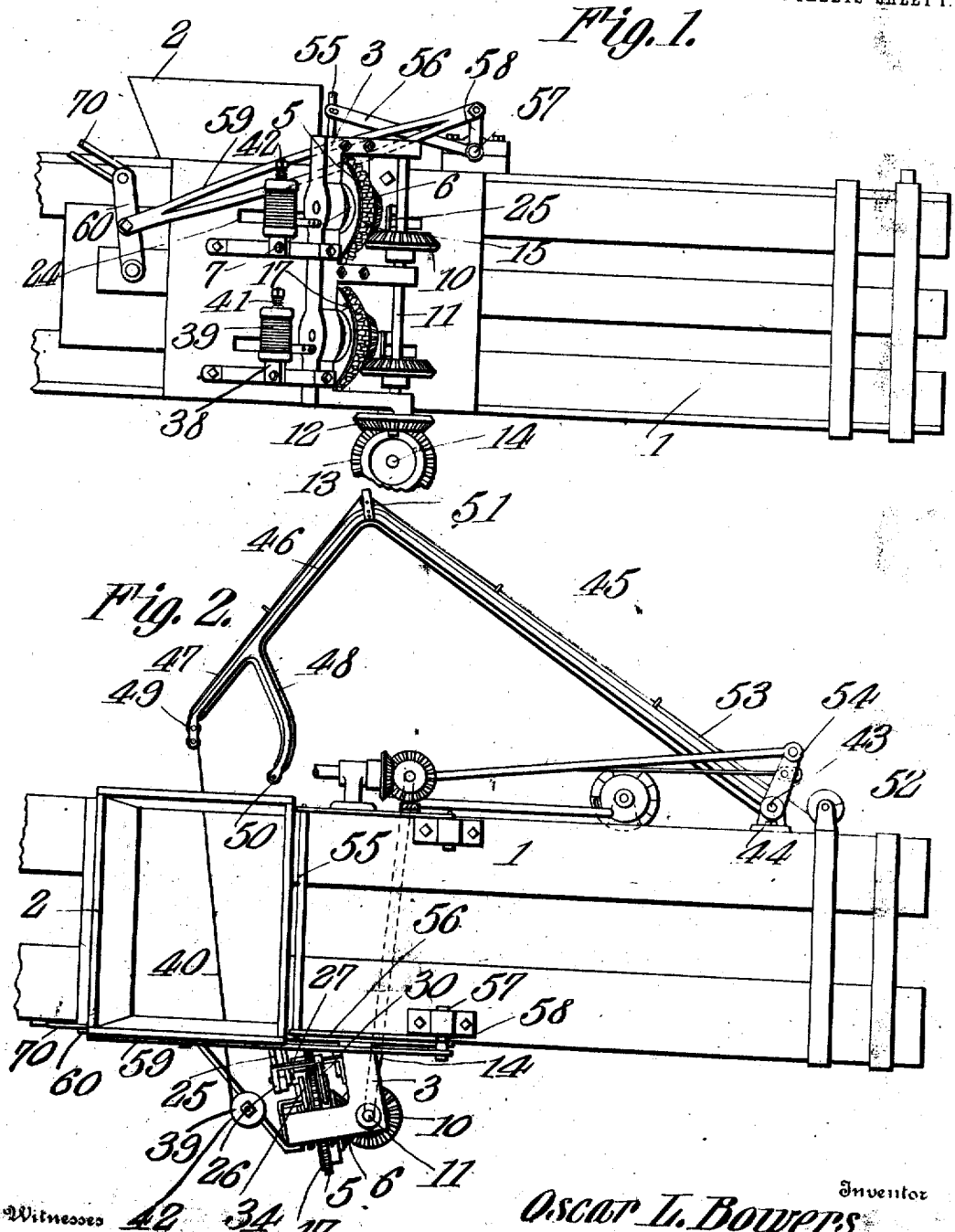

999,200.

Patented Aug. 1, 1911.
4 SHEETS—SHEET 2.

Witnesses

Inventor
Oscar L. Bowers,
By C. A. Snow & Co.
Attorneys

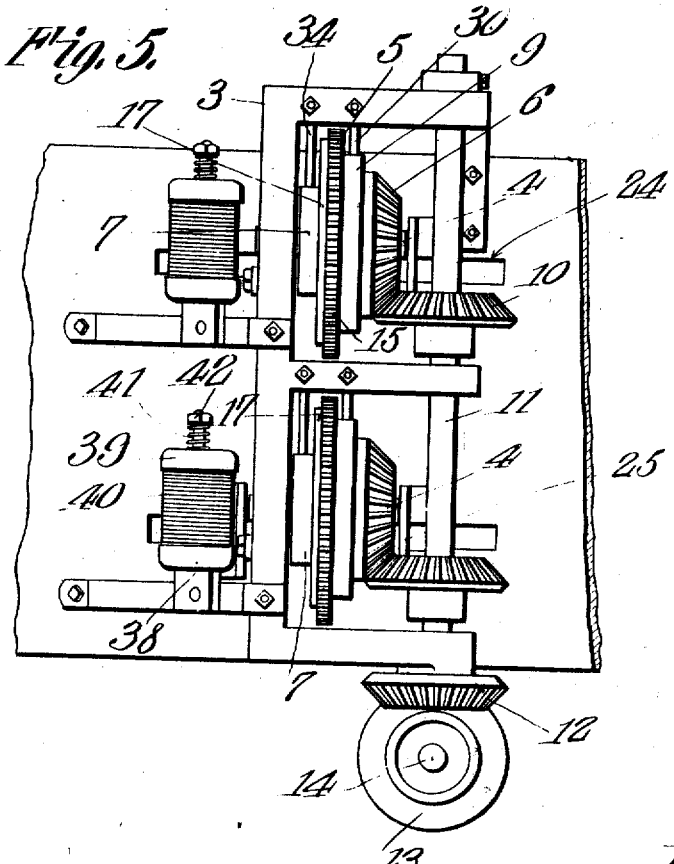

O. L. BOWERS.
WIRE TYING DEVICE
APPLICATION FILED DEC. 31, 1909. RENEWED MAY 29, 1911.
999,200.
Patented Aug. 1, 1911.
4 SHEETS—SHEET 4.
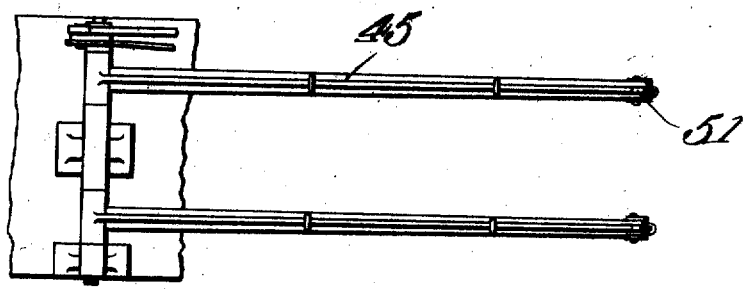
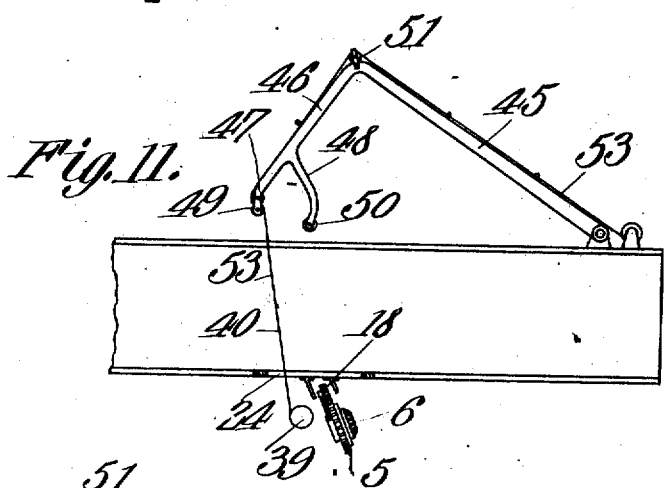
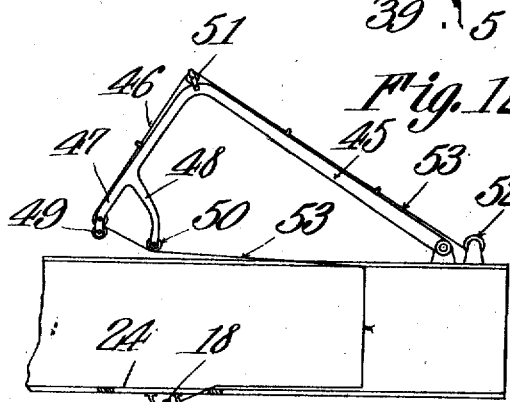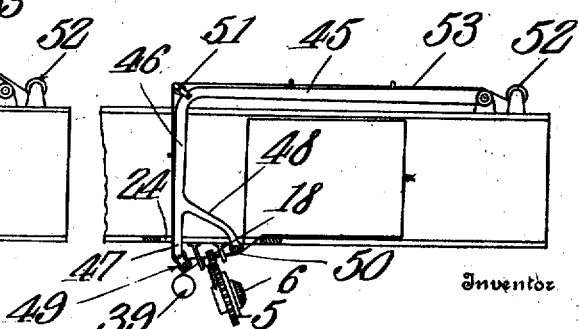
Inventor
Oscar L. Bowers,
By C. A. Snow & Co.
Attorneys
Witnesses

UNITED STATES PATENT OFFICE.

OSCAR L. BOWERS, OF WILLARD, ILLINOIS.

WIRE-TYING DEVICE.

999,200.

Specification of Letters Patent.   Patented Aug. 1, 1911.

Application filed December 31, 1909, Serial No. 535,860. Renewed May 29, 1911. Serial No. 630,123.

*To all whom it may concern:*

Be it known that I, OSCAR L. BOWERS, a citizen of the United States, residing at Willard, in the county of Alexander and State of Illinois, have invented a new and useful Wire-Tying Device, of which the following is a specification.

This invention has reference to improvements in wire tying devices and it is designed more particularly for tying bale wires in bale presses.

In accordance with the present invention each tie for the bale is made up of two wire strands united at the ends and then encircling the bale and finally fixed together at the other ends to complete the tie.

Figure 3:
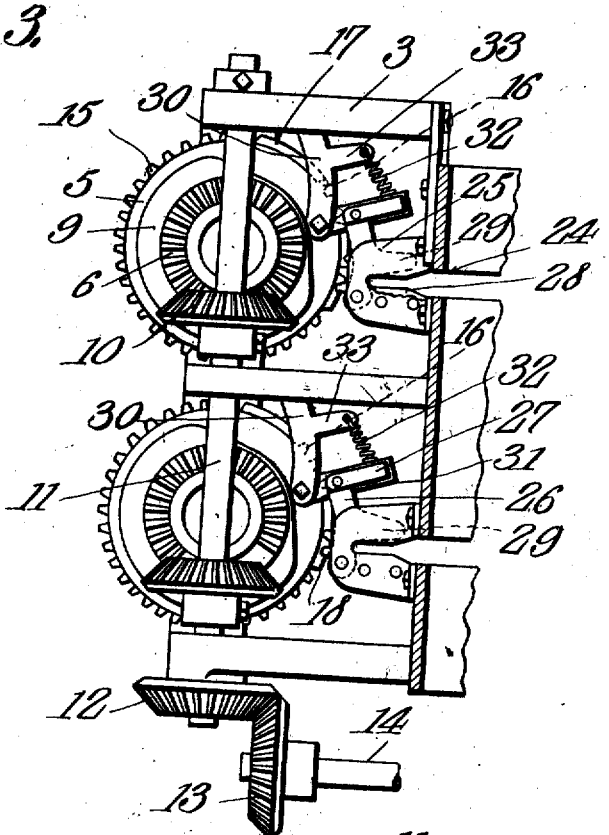
Figure 4:
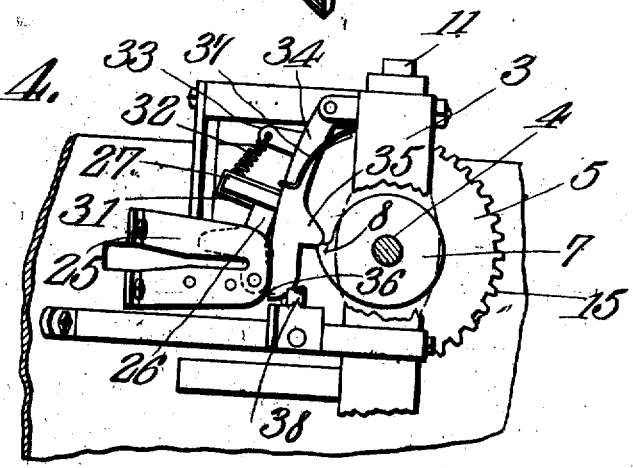

The invention will be best understood from a consideration of the following detail description taken in connection with the accompanying drawings forming a part of this specification, in which drawings, Figure 1 is a side elevation of a portion of a baling press taken from the wire tying side. Fig. 2 is a plan view of the structure shown in Fig. 1 and also illustrating co-acting parts. Fig. 3 is an elevation of the wire tying structure shown in Fig. 1 looking toward the power end of the press, the baling chamber being shown in section. Fig. 4 is a view of a portion of the structure of Fig. 3 looking toward the discharge end of the press, some parts being shown in section. Fig. 5 is an enlarged view of the wire tying structure of Fig. 1, the view being taken at a slightly different angle than the showing of Fig. 1. Fig. 6 is a detail view showing wire clamps in plan. Fig. 7 is a detail view of the means for severing the wire after being twisted. Figs. 8 and 9 are detail views of a portion of the twisting mechanism and a support therefor. Fig. 10 is an elevation of a part of the structure on the side of the machine remote from that shown in Fig. 1. Figs. 11, 12 and 13 are structural diagrams illustrating different phases in the operation of the device.

Referring to the drawings there is shown a baling press in so far as is necessary for the understanding of the present invention, the baling chamber 1 and usual hopper 2 being the only parts illustrated, it being understood of course that the usual plunger is present and that suitable operating means for the plunger are also considered as being present.

Attached to one side of the press adjacent to the baling chamber is a frame 3 of suitable shape to support the several structures making up the twisting mechanism.

In the particular structure illustrated each bale is to be secured by two wire strands spaced apart and encircling the bale and each encircling strand is made up of two members joined together at the ends in a manner which will hereinafter appear. There are therefore provided two twisting mechanisms which are identical in all respects and hence in the following description reference will be had to one of these twisting mechanisms only with the understanding that the description applies equally well to the other twisting mechanism.

Considering one twisting mechanism, there is secured to the frame 3 a stub-shaft 4 upon which is mounted a gear wheel 5 having on one face a bevel pinion 6 and on the other face a cam 7, the cam member 8 of which latter has but a short active length as compared with the circumference of the cam body 7, said member 8 being in the nature of a projecting tooth. On the face of the gear wheel 5 carrying the bevel pinion 6 there is formed a cam member 9 in the form of a ledge which is for the greater portion of its length concentric with the axis of rotation of the gear wheel 5, this concentric portion constituting the larger diameter of the cam, and for the remainder of the cam surface it approaches the said axis of rotation of the gear wheel 5. The gear wheel 5 is driven by a bevel pinion 10 engaging the bevel pinion 6, and the pinion 10 is mounted on a shaft 11 journaled in the frame 3 and below the same carrying another bevel pinion 12 meshing with a bevel pinion 13 on one end of a shaft 14 extending below and to the other side of the baling chamber 1.

The gear wheel 5 is of the mutilated type having a continuous series of gear teeth 15 extending about the greater portion of its circumference and a short series 16 of gear teeth spaced at each end from the main series 15 of gear teeth and to one side of the space separating the two series of gear teeth are ledges 17 for a purpose which will presently appear. The gear wheel 5 is in mesh with a pinion 18 provided with a hub 19 mounted in bearings formed at the ends of brackets 20 which latter are formed with divergent legs so that access to the pinions may be had through the space between the legs of the brackets. The pinion 18 is formed with diametrically disposed recesses 21 extending from the periphery of the pinion into the hub 19, this pinion 18 being designed as a twisting pinion and the recesses 21 being designed to receive wire strands which, when the pinion is rotated, become twisted together. On one face the pinion 18 is provided with an enlargement 22 which is flattened at diametrically opposite points as indicated at 23, the said flattened portions 23 being engaged by the ledges 17 so that under these circumstances the pinion 18 is held from rotation, but the pinion will be rotated by the engagement of either series of teeth 15 or 16 therewith when reached by such series of teeth in the rotation of the gear wheel 5.

Formed in the side walls of the baling chamber at a point coincident with the hopper 2 and opposite each gear wheel 5 is a slot 24 longitudinal of the press. At each end of the slot there is secured a bracket 25 with divergent legs so that the bracket straddles the slot. Carried by the two brackets 25 at the ends of a slot 24 are legs 26 of a frame 27, these legs being pivotally connected to the brackets. Mounted in each bracket on one of the legs thereof, this being the lower leg in the particular instance shown, is a fixed clamp member 28 while formed on each leg 26 of the frame 27 is a co-acting clamp member 29.

Pivotally secured to the frame 3 is an arm 80 the free end of which is in operative relation to the cam 9 formed on the gear wheel 5. This free end of the arm 30 is connected by a link 31 to the frame 27. A spring 32 connects the frame 27 where joined by the link 31 to a projection 33 on the arm 30. The spring 32 is of the contractile type and tends therefore to draw the frame 27 toward the projecting member 33, thus also tending to move the free end of the arm 30 toward the cam 9 and to separate the clamp members 28 and 29. When the free end of the arm 30 is resting on the portion of the cam 9 of small diameter then the clamp jaw 29 is separated from the clamp jaw 28 but when the portion of the cam 9 of larger diameter is brought into engagement with the free end of the arm 30 the latter is rocked on its pivot support and causes a rocking of the frame 27 on the pivot support of the latter in the bracket 25 in a direction to bring the cam member 29 toward the cam member 28 at the same time extending the spring 32.

Mounted on the frame 3 in pivotal relation thereto and located along the face of the gear wheel 5 carrying the cam member 7 is an arm 34 provided with a tooth or projection 35 in co-active relation to the tooth or cam projection 8 on the cam 7. The other edge of the arm 34 remote from that carrying the cam projection or tooth 35 is formed into a knife edge, this edge being indicated at 36. The location of the arm 34 is such that the knife edge 36 may be brought into engagement with the hub 19 at one side of the gear pinion 18, being forced into firm engagement therewith by the action of the cam tooth 8 upon the tooth or projection 35. A spring 37 tends to hold the arm 34 with the projection 35 in the path of the tooth 8 of the cam 7.

Mounted on a suitable bracket fast to the frame or support 3 and adjacent to each gear wheel 5 is a post or stem 38 for a spool 39 carrying a supply of wire 40. The spool may be held frictionally by means of a spring 41 applied to the stem 39 and held with any desired degree of friction by an adjustable nut 42.

On the side of the baling chamber remote from that carrying the frame 3 and parts sustained thereby, is a shaft 43 journaled in suitable brackets 44 and carrying two angle arms 45, these arms co-acting with the two twisting mechanisms on the opposite side of the baling chamber. A description of one of the arms 45 will apply to both, and the following description is to be so understood.

The arm 45 is provided with an angle extension 46 which may be about at right angles with the main portion of the arm 45 and at the free end the angle extension 46 is formed into two fingers 47—48, the finger 48 diverging from the finger 47 so that the ends are separated. At the free end of the finger 47 are rollers 49 and at the free end of the finger 48 is a roller 50, while at the angle of junction between the main portion of the arm 45 and its extension 46 is another roller 51.

Mounted on the frame 1 of the baling chamber is a reel 52 carrying a wire strand 53. The shaft 43 is under the control of an arm 54 by means of which the shaft 43 may be rocked sufficiently to carry the fingers 47 completely across the baling chamber and through the corresponding slot 24 in the other side of the baling chamber, the normal position of the fingers 47 and 48 being exterior to the baling chamber on the side thereof where the arms 45 are located, it being understood that suitable passages or slots are provided in the corresponding side of the baling chamber for the introduction of the fingers 47 and 48.

The mechanism for causing the rocking movement of the shaft 43 need not be described in detail in this case since mechanism such as shown in Letters Patent No. 942,305 granted to me on December 7, 1909 for automatic wire tying machine may be utilized for this purpose.

The strand 40 is carried from its reel or spool 39 to the adjacent brackets 25, thence through the slot 24 into the baling chamber where it is united to the end of the strand 53 coming from the reel or spool 52 from which latter the strand 53 is carried along the arm 45, over the roller 51, thence along the arm 46 and finger 47 and over the roller 49, there being preferably two rollers 49 over one of which the strand is carried and around the other of which the strand is also carried before being directed into the baling chamber. If now material be introduced into the press in the usual manner and the plunger be operated as is customary then the charge of material is forced along the baling chamber carrying the united strands 40 and 53 with it, the operations of introducing the material to be compressed and the reciprocation of the plunger being repeated as often as necessary to make the desired size of bale. The parts are so timed in operation that the requisite number of feedings and compressions having been accomplished the shaft 43 is turned in a direction to move the arms 45 toward the baling chamber. In the meantime the united wire strands 40 and 53 have been forced along by the bale and sufficient wire for the purpose has been withdrawn from the reels or spools 39 and 52. The withdrawing of the strands 40 from the reel 39 has caused it to move through the brackets 20 into a slot or recess 21 in the pinion 18, this slot being then in line with the space between the legs of the brackets 20 while the strand 53 has been moved from engagement with the outer one of the rollers 49 and into engagement with the roller 50 on the end of the finger 48. On the actuation of the shaft 43 the arm 45 carries the fingers 47 and 48 across the baling chamber on the plunger end thereof, and the strand 53 is carried ultimately through the slot 24 and into the space between the legs of the brackets 25 and 20 and into a recess 21 in the pinion 18. In the meantime however the shaft 14 has been rotated sufficiently to cause the gear wheel 5 to move about its supporting shaft to bring the short series 16 of gear teeth into engagement with the pinion 18 and cause the latter to move through one-half a revolution so that the recess receiving the strand 40 has moved out of the path of the oncoming strand 53 and the other recess has been presented for the reception of this strand. The continued rotation of the gear wheel 5 causes the teeth 16 to leave the pinion 18 while the adjacent ledge 17 is brought into engagement with the flattened portion of the enlargement 22 on one face of the pinion 18 thus holding the latter against rotation while the strand 53 is being seated in the corresponding recess 21, this locking of the pinion preventing over-riding of the proper position of the parts. As soon as the strand 53 has become seated in the recess 21 then the continued rotation of the gear wheel 5 brings the gear teeth 15 into engagement with the pinion and causes the latter to rotate a number of times about its axis, thus imparting a twist to the wires so that the adjacently lying strands 40 and 53 are twisted together on each side of the pinion 18. Just before the gear teeth 15 leave the pinion 18 the cam tooth 8 is brought into engagement with the projection 35 on the knife arm 34 and the knife edge 36 is brought into engagement with the hub of the pinion 18 so that the two strands are caused to move into engagement with the knife edge and are thus severed.

It will be observed that when the arm 45 was moved in a direction to cause the fingers 47 and 48 to traverse the chamber in a direction toward the twisting mechanism, that the strand 40 is then lying along one side of the bale and across the end thereof remote from the plunger where it is joined to the strand 53 which continues across the same end of the bale and along the side thereof remote from the strand 40 and is then carried across the plunger end of the bale by the finger 48, the wire strand paying out from the reel or spool 52, being then directed along the arm 45, around the roller 51, thence along the arm 46 and finger 47, thence around one of the rollers 49 and across the space between the finger 47 and finger 48, thence around the roller 50 to the point of junction with the strand 40 at the other end of the bale. The portion of the strand 53 which is twisted into engagement with the strand 40, lies between the two fingers 47 and 48, these fingers straddling the twisting pinion 18, while the twisting is taking place. Just prior to the twisting action, the arm 30 is engaged by the portion of the cam 9 of greater diameter, so that the clamp members 29 are brought toward the clamp members 28 thus grasping the wire strands lying between these clamp members so that the wire strands are tightly clamped while being twisted. As soon as the twisting operation is completed and the strands are severed along one face of the twisting pinion 18, the rotative movement of the twisting pinion 18 ceases since the gear teeth 16 move out of engagement with the said pinion and the latter is held against further movement by the engagement therewith of the adjacent ledge 17. The parts are so timed that as soon as the wire strands are severed the cam tooth 8 rides from under the projections 35 and the spring 37 returns the knife arm 34 to its normal position, the arm 45 is moved in a direction toward its initial position, thus drawing the junction point of the strands 53 and 40 to a position about intermediate of the width of the baling chamber and the parts are all in position for the formation of another bale and the securing of the same by the wire strands in the manner already described.

It will be seen that two distinct wire strands are employed on opposite sides of the press for each loop about the bale, and it is evident that as many loops as may be desired may be used by simply duplicating the mechanism. It will also be observed that each time a tie is completed the two strands coming from opposite sides of the machine are united to form the next succeeding loop designed to encircle the bale.

It is desirable that all loose portions of the material being baled on the plunger end of the bale should be smoothed down before the wire strands are moved across the said end of the bale. For this purpose there is provided a blade 55 movable into and out of the baling chamber on the plunger side of the completed bale, and this blade is hung on the arms 56 fast on a rock shaft 57 which in turn is moved by an arm 58 connected by a link 59 to a rock arm 60 which in turn may be connected to the operating mechanism of the baling press by another link 70, the structure being such that the blade 55 will be withdrawn from the path of the oncoming material being compressed at the proper time, and will also be withdrawn from the path of the strands 53 when moved across the plunger end of the bale.

What is claimed is:—

1. In a baling mechanism, wire storing means on each side of the baling chamber, carrying means for the wire on one side of the baling chamber for transporting it to the other side thereof, twisting means at one side of the baling chamber for uniting the wire from both storing means together, a clamp for engaging the wires on each side of the twisting mechanism, and a cutter acting on the twisted wires between the clamps.

2. In a baling mechanism, wire storing means on each side of the baling chamber, means for directing a loop of the united wires about a bale, means for bringing the wires into juxtaposition, means for clamping the wires at spaced points along the juxtaposed portion, twisting means for uniting the adjacent portions of the wires after encircling the bale, and severing means for cutting the twisted portions of the wires at an intermediate part of the twist.

3. In a baling mechanism, a twisting mechanism comprising a mutilated gear wheel with peripheral locking ledges, cams on opposite sides of said gear wheel, a pinion in mesh with said gear wheel and provided with diametric slots and a flattened projection on one face, clamp members in operative relation to the slotted pinion, clamp operating connections between the clamp members and one of the cams of the gear wheel, and a wire severing knife in operative relation to the pinion and actuated by the cam on the other side of the gear wheel.

In testimony that I claim the foregoing as my own, I have hereto affixed my signature in the presence of two witnesses.

OSCAR L. BOWERS.

Witnesses:
SIDNEY A. FULTS,
OSCAR L. THORNTON.